United States Patent Office 2,708,618
Patented May 17, 1955

2,708,618
PURIFICATION OF AMMONIUM BERYLLIUM FLUORIDE SOLUTIONS

Carl W. Schwenzfeier, Jr., Woodville, Ohio, assignor, by mesne assignments, to the United States of America as represented by the United States Atomic Energy Commission No Drawing. Application April 30, 1953,
Serial No. 352,297

4 Claims. (Cl. 23—88)

This invention relates to the purification of ammonium beryllium fluoride solutions and more particularly to the removal of chromium and/or manganese impurities therefrom.

In the derivation of ammonium beryllium fluoride from beryllium oxide, manganese and chromium impurities find their way into the product from the various iron alloys used to construct the vessels in which the intermediate reactions take place.

It is therefore an object of the present invention to substantially diminish the amount of chromium and/or manganese impurities contained in aqueous solutions of ammonium beryllium fluoride. A further object is to simultaneously remove chromium and manganese impurities from aqueous solutions of ammonium beryllium fluoride. Other objects will appear hereinafter.

These objects are accomplished in accordance with the present invention by treating an aqueous solution of ammonium beryllium fluoride with $PbO_2$ to cause precipitation of manganese and/or chromium impurities therefrom. It has been discovered that both chromium and manganese can be very effectively separated from aqueous ammonium beryllium fluoride solutions by treating such solutions with lead peroxide, $PbO_2$ to effect substantially complete removal of both contaminants. To effect this separation lead peroxide is added to an ammonium beryllium fluoride solution which has previously been adjusted to a pH of at least 5. The resulting slurry is then brought to a boil, and the precipitate is separated therefrom.

The following examples illustrate but do not limit the invention.

Example 1

To 2870 liters of an aqueous ammonium beryllium fluoride solution that contained 19.5 grams of beryllium, 0.24 gram of manganese and 0.014 gram of chromium per liter there were added 100 pounds of calcium carbonate and 20 pounds of $PbO_2$. The resulting slurry was then brought to a boil and filtered. The filtrate was found to contain 19.9 grams of beryllium, less than 0.006 gram of manganese and 0.005 gram of chromium per liter, which showed that most of the manganese and chromium impurities were removed by the treatment.

Example 2

To 2700 liters of an aqueous ammonium beryllium fluoride solution which contained 0.198 gram of manganese and 0.015 gram of chromium per liter there was added 100 pounds of calcium carbonate and 20 pounds of $PbO_2$. The resulting slurry was brought to a boil and filtered. The filtrate was found to contain less than 0.003 gram of manganese and 0.005 gram of chromium per liter.

Example 3

In a laboratory test, four 50 ml. portions of an aqueous ammonium beryllium fluoride solution containing 0.73 milligram of manganese per 50 ml. were treated with 25, 50, 75, and 100 milligrams of $PbO_2$ respectively. After filtration it was found that the separate filtrates contained 0.25, 0.17, 0.11, and 0.03 milligram of manganese per 50 ml. respectively, and that there had been no substantial loss of beryllium.

Example 4

An aqueous ammonium beryllium fluoride solution which contained 0.077 gram per liter of manganese and 0.013 gram per liter of chromium was adjusted to a pH of 5. To 1 liter of this solution there was added 1.75 grams of $PbO_2$. After boiling and filtering the resultant slurry it was found that 100% of the manganese but only 51% of the chromium had been thereby removed. Increasing the amount of $PbO_2$ used from 1.75 grams to 2 grams per liter increased the amount of chromium removed from 51% to 63% and did not cause any decrease in manganese removal.

Example 5

An aqueous ammonium beryllium fluoride solution which contained 0.077 gram per liter of manganese and 0.013 gram per liter of chromium was adjusted to a pH of 6. To 1 liter of this solution there was added 1.5 grams of $PbO_2$. After boiling and filtering the resultant slurry it was found that 100% of the manganese but only 62% of the chromium had been precipitated therefrom. Increasing the amount of $PbO_2$ used from 1.5 grams to 2 grams per liter increased the amount of chromium removed from 62% to 79% and did not cause any decrease in the amount of manganese precipitated.

Example 6

An aqueous ammonium beryllium fluoride solution which contained 0.077 gram per liter of manganese and 0.013 gram per liter of chromium was adjusted to a pH of 7. To 1 liter of this solution there was added 1.25 grams of $PbO_2$. After boiling and filtering the resultant slurry it was found that 100% of the manganese but only 73% of the chromium had been precipitated therefrom. Increasing the amount of $PbO_2$ used from 1.25 grams to 2 grams per liter increased the amount of chromium precipitated from 73% to 92% while the amount of manganese precipitation remained at 100%.

Example 7

An aqueous ammonium beryllium fluoride solution which contained 0.077 gram per liter of manganese and 0.013 gram per liter of chromium was adjusted to a pH of 8. To 1 liter of this solution there was added 1.5 grams of $PbO_2$. After boiling and filtering the resultant slurry it was found that 100% of the manganese but only 86% of the chromium had been precipitated therefrom. Increasing the amount of $PbO_2$ used from 1.5 grams to 2 grams per liter increased the amount of chromium precipitated from 86% to 91% while the amount of manganese precipitation remained at 100%.

From the experimental work discussed above, particularly in Examples 4 to 7, it has been discovered that the pH of the ammonium beryllium fluoride solution should be about 7 to secure optimum manganese and chromium removal with a minimum addition of $PbO_2$. Manganese may be completely removed from a solution whose pH is 5 or above with a minimum of $PbO_2$, but the best chromium removal is obtained at a pH of 7 or above. The pH adjustments mentioned in Examples 4 to 7 were made by the appropriate addition of HF or of $NH_4OH$ thereto.

The amount of lead peroxide to be added to an ammonium beryllium fluoride solution to effect the separation of manganese and chromium therefrom is dependent upon the amount of these impurities present. It has been found that 16.2 grams of commodity lead peroxide (analyzing 88.7–91.0% in PbO$_2$) per gram of manganese at manganese concentrations of 0.05 to 0.1 gram per liter will precipitate substantially all of the manganese present. 310 to 58 grams of lead peroxide per gram of chromium at chromium concentrations of 0.001 to 0.01 gram per liter are necessary to remove substantially all of the chromium present. The necessary lead peroxide to chromium ratio increases as the chromium concentration decreases.

Resort may be had to such modifications and variations as fall within the spirit of the invention and the scope of the appended claims.

I claim:

1. A process of substantially diminishing the amount of chromium impurities contained in an ammonium beryllium fluoride solution which comprises adding PbO$_2$ thereto, boiling the resulting slurry, and then removing the precipitate therefrom.

2. A process as set forth in claim 1 in which the ammonium beryllium fluoride is brought to a pH of at least 5 before the PbO$_2$ is added thereto.

3. A process of substantially reducing the amount of chromium impurities in an ammonium beryllium fluoride solution which comprises bringing the pH of said solution to a value of at least 6, adding PbO$_2$ thereto, boiling the resulting slurry, and then removing the precipitate therefrom.

4. A process as recited in claim 3 in which the pH value of the ammonium beryllium fluoride solution is adjusted to a value from 7 to 8 before the PbO$_2$ is added thereto.

References Cited in the file of this patent

UNITED STATES PATENTS 2,532,102     Kawecki _____ Nov. 28, 1950

OTHER REFERENCES

Schoenbein, Annalen der Physik and Chemie, vol. 78, pages 162–173, particularly page 166 (1849).